(12) United States Patent
Liu et al.

(10) Patent No.: US 11,834,619 B1
(45) Date of Patent: Dec. 5, 2023

(54) HYBRID MEMBRANES WITH FUNCTIONALIZED FILLERS FOR NATURAL GAS SWEETENING

(71) Applicant: Saudi Arabian Oil Company, Dhahran (SA)

(72) Inventors: Yang Liu, Belmont, MA (US); Junyan Yang, Acton, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/082,979

(22) Filed: Dec. 16, 2022

(51) Int. Cl.
| | |
|---|---|
| *C10L 3/10* | (2006.01) |
| *C08G 73/10* | (2006.01) |
| *C08K 5/56* | (2006.01) |
| *B01D 53/22* | (2006.01) |
| *B01D 69/02* | (2006.01) |
| *B01D 71/02* | (2006.01) |
| *B01D 71/64* | (2006.01) |
| *B01D 67/00* | (2006.01) |
| *B01D 69/14* | (2006.01) |

(52) U.S. Cl.
CPC ............ *C10L 3/104* (2013.01); *B01D 53/228* (2013.01); *B01D 67/0079* (2013.01); *B01D 69/02* (2013.01); *B01D 69/1411* (2022.08); *B01D 71/028* (2013.01); *B01D 71/0221* (2022.08); *B01D 71/64* (2013.01); *C08G 73/1042* (2013.01); *C08G 73/1067* (2013.01); *C08K 5/56* (2013.01); *C10L 3/103* (2013.01); *B01D 2325/20* (2013.01); *C10L 2290/548* (2013.01)

(58) Field of Classification Search
CPC .... C10L 3/104; C10L 3/103; C10L 2290/548; B01D 53/228; B01D 67/0079; B01D 69/02; B01D 69/1411; B01D 71/0221; B01D 71/028; B01D 71/64; B01D 2325/20; C08G 73/1042; C08G 73/1067; C08K 5/56

See application file for complete search history.

(56) References Cited

U.S. PATENT DOCUMENTS

2020/0047114 A1   2/2020   Al-Maythalony et al.

FOREIGN PATENT DOCUMENTS

| CN | 104710559 B | 10/2016 |
|---|---|---|
| CN | 110052182 B | 10/2020 |
| CN | 110563992 B | 4/2021 |

OTHER PUBLICATIONS

Koros et al. ("Gas separation performance of 6FDA-based polyimides with different chemical structures", Polymer 54 (2013) 6226-6235). (Year: 2013).*

Ahmad et al. ("Enhanced gas separation performance of 6FDA-DAM based mixed matrix membranes by incorporating MOF UiO-66 and its derivatives", Journal of Membrane Science 558 (2018) 64-77). (Year: 2018).*

(Continued)

*Primary Examiner* — Ali Z Fadhel
(74) *Attorney, Agent, or Firm* — Fish & Richardson P.C.

(57) ABSTRACT

This disclosure relates to hybrid membranes comprising functionalized fillers within a polymer matrix and methods of using the membranes for gas separation applications, such as removal of hydrogen sulfide ($H_2S$) and carbon dioxide ($CO_2$) from natural gas.

24 Claims, 8 Drawing Sheets

(56) References Cited

OTHER PUBLICATIONS

Ahmad et al. ("Enhancement of CO2/CH4 separation performances of 6FDA-based copolyimides mixed matrix membranes embedded with UiO-66 nanoparticles", Separation and Purification Technology 192 (2018) 465-474). (Year: 2018).*

Ahmad et al., "High-pressure $CO_2/CH4$ separation of Zr-MOFs based mixed matrix membranes," Separation and Purification Technology, 2020, 230:115858, 10 pages.

Ashtiani et al., "Surface and interface engineering in $CO_2$-philic based UiO-66-$NH_2$-PEI mixed matrix membranes via covalently bridging PVP for effective hydrogen purification," International Journal of Hydrogen Energy, 2021, 46(7):5449-5458, 10 pages.

Ghalei et al., "Enhanced selectivity in mixed matrix membranes for $CO_2$ capture through efficient dispersion of amine-functionalized MOF nanoparticles," Nature Energy, 2017, 2(7), 21 pages.

Guo et al., "Preparation of Thin Film Nanocomposite Membranes with Surface Modified MOF for High Flux Organic Solvent Nanofiltration," AIChE Journal, 2017, 63(4): 1303-1312, 10 pages.

Hossain et al., "Cross-Linked Mixed-Matrix Membranes Using Functionalized UiO-66-$NH_2$ into PEG/PPG-PDMS-Based Rubbery Polymer for Efficient $CO_2$ Separation," ACS Applied Materials & Interfaces, 2020, 12(52):57916-57931, 16 pages.

Isfahani et al., "Tuning the morphology of segmented block copolymers with Zr-MOF nanoparticles for durable and efficient hydrocarbon separation membranes," Journal of Materials Chemistry A, 2020, 8(18):9382-9391, 10 pages.

Jadhav et al., "Synthesis and characterization of mixed-matrix material of Zirconium based metal organic framework (MOF: UiO-66-$NH_2$) and poly(ether-urethane-urea)," Materials Today-Proceedings, 2020, 28:734-738, 5 pages.

Jiang et al., "A new UiO-66-$NH_2$ based mixed-matrix membranes with high $CO_2/CH_4$ separation performance," Microporous and Mesoporous Materials, 2019, 274:203-211, 42 pages.

Liu et al., "Enabling Fluorinated MOF-Based Membranes for Simultaneous Removal of $H_2S$ and $CO_2$ from Natural Gas," Angewandte Chemie International Edition, 2018, 57(45): 14811-14816, 9 pages.

Liu et al., "High-throughput $CO_2$ capture using PIM-1@MOF based thin film composite membranes," Chemical Engineering Journal, 2020, 396, 24 pages.

Liu et al., "Mixed matrix formulations with MOF molecular sieving for key energy-intensive separations," Nature Materials, 2018, 17(3):283-289, 34 pages.

Liu et al., "Penetrant competition and plasticization in membranes: How negatives can be positives in natural gas sweetening," Journal of Membrane Science, 2021, 119201, 24 pages.

Lu et al., "Preparation of Amino-Functional UiO-66/PIMs Mixed Matrix Membranes with [bmim] [$Tf_2N$] as Regulator for Enhanced Gas Separation," Membranes, 2021, 11(1), 15 pages.

Nguyen et al., "In-situ cross interface linking of PIM-1 polymer and UiO-66-$NH_2$ for outstanding gas separation and physical aging control," Journal of Membrane Science, 2018, 548:429-438, 25 pages.

Qian et al., "Impact of Post-Synthetic Modification Routes on Filler Structure and Performance in Metal-Organic Framework-Based Mixed-Matrix Membranes," Industrial & Engineering Chemistry Research 2020, 59(12):5432-5438, 7 pages.

Qian et al., "Mixed-Matrix Membranes Formed from Imide-Functionalized UiO-66-$NH_2$ for Improved Interfacial Compatibility," ACS Applied Materials & Interfaces, 2019, 11(34):31257-31269, 13 pages.

Schimadzu Corporation, "Capillary and Packed Gas Chromatograph GC-2014," Brochure, 2004, 14 pages.

Scilogex, "SCI100-S LED Digital Rotary Evaporator," SCILOGEX Rotary Evaporators & Accessories Brochure, retrieved on Jun. 21, 2023, 11 pages.

Su et al., "Enhanced permeation arising from dual transport pathways in hybrid polymer-MOF membranes," Energy & Environmental Science, 2016, 9(3):922-931, 10 pages.

Wang et al., "Constructing Strong Interfacial Interactions under Mild Conditions in MOF-Incorporated Mixed Matrix Membranes for Gas Separation," ACS Applied Materials & Interfaces, 2021, 13(2):3166-3174, 9 pages.

Wang et al., "Polymers of intrinsic microporosity/metal-organic framework hybrid membranes with improved interfacial interaction for high-performance $CO_2$ separation," Journal of Materials Chemistry A, 2017, 5(22): 10968-10977, 12 pages.

Wang et al., "Preparation of UiO-66/DMBPTB and UiO-66-$NH_2$/DMBPTB Nanocomposite Membranes with Enhanced $CO_2/CH_4$ Selectivity for Gas Separation," ChemistrySelect, 2020, 5(45): 14251-14260, 10 pages.

Wu et al., "Enhancing the Gas Separation Selectivity of Mixed-Matrix Membranes Using a Dual-Interfacial Engineering Approach," Journal of the American Chemical Society, 2020, 142(43):18503-18512, 10 pages.

Yao et al., "Post-Synthetic Polymerization of UiO-66-$NH_2$ Nanoparticles and Polyurethane Oligomer toward Stand-Alone Membranes for Dye Removal and Separation," Chemistry-A European Journal, 2016, 22(30): 10565-10571, 8 pages.

Zhang et al., "Fabrication of cellulose nanofibrils/UiO-66-$NH_2$ composite membrane for $CO_2/N_2$ separation," Journal of Membrane Science, 2018, 568:10-16, 7 pages.

* cited by examiner

HYBRID MEMBRANES WITH FUNCTIONALIZED FILLERS FOR NATURAL GAS SWEETENING

TECHNICAL FIELD

This document relates to hybrid membranes including functionalized fillers within a polymer matrix. This document also relates to methods of using said membranes for the removal of hydrogen sulfide ($H_2S$) and carbon dioxide ($CO_2$) from natural gas.

BACKGROUND

Natural gas supplies over 20% of the energy used worldwide and makes up nearly a quarter of electricity generation, and also plays a crucial role as a feedstock for industry. Raw natural gas is formed primarily of methane ($CH_4$). However, it also contains significant amounts of other components, such as acid gases (for example, carbon dioxide ($CO_2$) and hydrogen sulfide ($H_2S$)). The bulk removal of these gases, referred to as "natural gas sweetening," will not only bring about huge savings in operation costs and in capital investments in post-treatment units, but will also make these units more tolerable to significant deviations in treatment loads (feed gas quality and flow), which is a challenge for gas processing.

A widely applied technology used for the removal of acid gas from gas mixtures is amine absorption. However, this process is highly energy intensive due to the significant amount of energy needed for regenerating the amine solvent for reuse, which accounts for up to 80% of the total energy cost in the process. Moreover, such a process also consumes a significant amount of water. Furthermore, amine tends to degrade after a number of runs.

Another technology that has gained greater industrial application is the use of polymeric membrane-based technology for gas separation applications, such as natural gas sweetening, oxygen enrichment, hydrogen purification, and nitrogen and organic compounds removal from natural gas. Though this technology has high energy efficiency, a small footprint (ease of processability into different configurations), and low capital cost, there exists a trade-off behavior between productivity (permeability) and efficiency (selectivity). Polyimide membranes, such as those that contain 6FDA, constitute a large portion of the membrane market in gas separation. However, industrial applications of polyimide membranes are still limited for bulk removal of aggressive acid gases from natural gas due to their low permeability and high $CO_2$ plasticization.

Therefore, there is a need for new hybrid membranes for removing $CO_2$ and $H_2S$ from natural gas that can be used under industrial conditions, actual field environments, and testing conditions, that exhibit a combination of high permeability and high selectivity.

SUMMARY

Provided in the present disclosure are hybrid membranes including functionalized fillers within a polymer matrix, as well as methods for preparing the hybrid membranes and using the hybrid membranes for gas separation applications, such as removal of hydrogen sulfide ($H_2S$) and carbon dioxide ($CO_2$) from natural gas.

Thus, provided in the present application is a hybrid membrane including a metal organic framework (MOF) filler, where the MOF filler is UiO-66 or a functionalized UiO-66; and a polymer, where the polymer is a 6FDA-DAM/DABA polymer. In some embodiments, the 6FDA-DAM/DABA polymer is 6FDA-DAM/DABA (3:2). In some embodiments, the MOF filler is a functionalized UiO-66, where the functionalized UiO-66 is selected from UiO-66-FA, UiO-66-$NH_2$, and UiO-66-COOH.

In some embodiments, the MOF filler is about 1 wt % to about 25 wt %, about 3 wt % to about 20 wt %, about 5 wt % to about 15 wt %, about 7 wt % to about 13 wt %, or about 9 wt % to about 11 wt % of the hybrid membrane. In some embodiments, the MOF filler is about 10 wt % of the hybrid membrane.

In some embodiments, the polymer is about 75 wt % to about 99 wt %, about 80 wt % to about 97 wt %, about 85 wt % to about 95 wt %, about 87 wt % to about 93 wt %, or about 89 wt % to about 91 wt % of the hybrid membrane. In some embodiments, the polymer is about 90 wt % of the hybrid membrane.

In some embodiments, the MOF filler is about 5 wt % to about 15 wt % of the hybrid membrane and the polymer is about 85 wt % to about 95 wt % of the hybrid membrane. In some embodiments, the UiO-66-$NH_2$ is about 5 wt % to about 15 wt % of the hybrid membrane and the polymer is about 85 wt % to about 95 wt % of the hybrid membrane. In some embodiments, the UiO-66-COOH is about 5 wt % to about 15 wt % of the hybrid membrane and the polymer is about 85 wt % to about 95 wt % of the hybrid membrane.

In some embodiments, the hybrid membrane exhibits (i) an $H_2S$-permeability increase of about 20% to about 140%; and (ii) an $H_2S/CH_4$ selectivity increase of about 20% to about 50%; at a pressure of 200 psig as compared to the same polyimide-based membrane that does not include a metal organic framework (MOF) filler that is UiO-66 or functionalized UiO-66. In some embodiments, the hybrid membrane exhibits (i) a $CO_2$-permeability increase of about 15% to about 150%; and (ii) a $CO_2/CH_4$ selectivity increase of about 15% to about 50%; at a pressure of 200 psig as compared to the same polyimide-based membrane that does not include a metal organic framework (MOF) filler that is UiO-66 or functionalized UiO-66. In some embodiments, the hybrid membrane exhibits (i) an $H_2S$-permeability increase of about 20% to about 140%; (ii) an $H_2S/CH_4$ selectivity increase of about 20% to about 50%; (iii) a $CO_2$-permeability increase of about 15% to about 150%; and (iv) a $CO_2/CH_4$ selectivity increase of about 15% to about 50%; at a pressure of 200 psig as compared to the same polyimide-based membrane that does not include a metal organic framework (MOF) filler that is UiO-66 or functionalized UiO-66.

Also provided is a hybrid membrane prepared according to the methods of the present disclosure.

In some embodiments, the method of preparing a hybrid membrane includes providing a polymer solution including a first solvent and a polymer, which is a 6FDA-DAM/DABA polymer; combining the polymer solution with a metal organic framework (MOF) filler solution including a second solvent and a metal organic framework (MOF) filler, where the MOF filler is UiO-66 or functionalized UiO-66, to form a MOF-polymer solution, including a third solvent; evaporating the third solvent to form a hybrid membrane film; and drying the hybrid membrane film to form the hybrid membrane. In some embodiments, the 6FDA-DAM/DABA polymer is 6FDA-DAM/DABA (3:2). In some embodiments, the MOF filler is functionalized UiO-66, where the functionalized UiO-66 is selected from UiO-66-FA, UiO-66-$NH_2$, and UiO-66-COOH.

In some embodiments, the method of separating at least one impurity from natural gas includes providing a hybrid membrane including a metal organic framework (MOF) filler, where the MOF filler is UiO-66 or functionalized UiO-66; and a polymer, where the polymer is a 6FDA-DAM/DABA polymer; introducing a natural gas stream to the hybrid membrane; and removing at least one impurity from the natural gas.

In some embodiments, the 6FDA-DAM/DABA polymer is 6FDA-DAM/DABA (3:2). In some embodiments, the MOF filler is functionalized UiO-66, where the functionalized UiO-66 is selected from UiO-66-FA, UiO-66-NH$_2$, and UiO-66-COOH.

In some embodiments, the impurity in the natural gas is selected from hydrogen sulfide (H$_2$S), carbon dioxide (CO$_2$), ethane (C$_2$H$_6$), nitrogen (N$_2$), C$_3$+ hydrocarbons, water (H$_2$O), and combinations thereof. In some embodiments, the impurity is a combination of hydrogen sulfide (H$_2$S) and carbon dioxide (CO$_2$).

In some embodiments, the hybrid membrane exhibits (i) an H$_2$S-permeability increase of about 20% to about 140%; and (ii) an H$_2$S/CH$_4$ selectivity increase of about 20% to about 50%; at a pressure of 200 psig as compared to the same polyimide-based membrane that does not include a metal organic framework (MOF) filler that is UiO-66 or functionalized UiO-66. In some embodiments, the hybrid membrane exhibits (i) a CO$_2$-permeability increase of about 15% to about 150%; and (ii) a CO$_2$/CH$_4$ selectivity increase of about 15% to about 50%; at a pressure of 200 psig as compared to the same polyimide-based membrane that does not include a metal organic framework (MOF) filler that is UiO-66 or functionalized UiO-66. In some embodiments, the hybrid membrane exhibits (i) an H$_2$S-permeability increase of about 20% to about 140%; (ii) an H$_2$S/CH$_4$ selectivity increase of about 20% to about 50%; (iii) a CO$_2$-permeability increase of about 15% to about 150%; and (iv) a CO$_2$/CH$_4$ selectivity increase of about 15% to about 50%; at a pressure of 200 psig as compared to the same polyimide-based membrane that does not include a metal organic framework (MOF) filler that is UiO-66 or functionalized UiO-66.

DETAILED DESCRIPTION

Figure 1A:
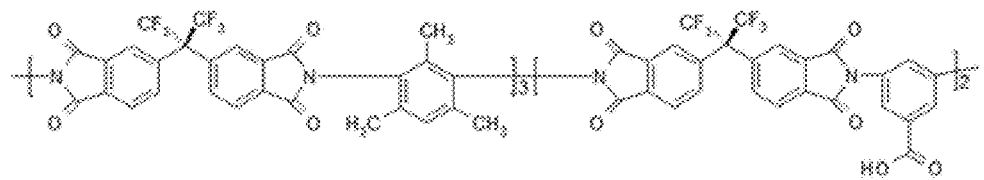
FIG. 1A shows the chemical structure of 6FDA-DAM/DABA (3:2).

The present disclosure relates to hybrid membranes that can be used for industrial gas processing, having a combination of high permeability and high selectivity. The present disclosure relates to hybrid membranes including a metal organic framework (MOF) filler and a polymer, and methods for making and using the hybrid membranes for natural gas separation applications. In some embodiments, incorporation of the MOF filler into the polymer membranes improves the gas transport properties in natural gas separation.

In some embodiments, the incorporation of a MOF filler into a polymer matrix (for example, 6FDA-DAM/DABA) produces a hybrid membrane that exhibits increased permeability for CO$_2$ and H$_2$S as compared to the same membrane that does not include a MOF filler. In some embodiments, the incorporation of a MOF filler into a polymer matrix (for example, 6FDA-DAM/DABA) produces a hybrid membrane that displays high CO$_2$/CH$_4$ and H$_2$S/CH$_4$ selectivity as compared to the same membrane that does not include a MOF filler. In some embodiments, the incorporation of a MOF filler into a polymer matrix (for example, 6FDA-DAM/DABA) produces a hybrid membrane that displays high permeability for CO$_2$ and H$_2$S, and high CO$_2$/CH$_4$ and H$_2$S/CH$_4$ selectivity as compared to the same membrane that does not include a MOF filler.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Polymers

The hybrid membranes of the present disclosure contain a polymer. In some embodiments, the polymer is a co-polyimide polymer. In some embodiments, the polymer is a 4,4'-(hexafluoroisopropylidene) diphthalic anhydride (6FDA)-2,4,6-trimethyl-1,3-diaminobenzene (DAM)/3,5-diaminobenzoic acid (DABA) (6FDA-DAM/DABA).

In some embodiments, the 6FDA-DAM/DABA polymer is selected from the group consisting of poly (2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (1:1)), poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (3:1)), poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (3:2)), and poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (5:1)). The ratio in parentheses stands for the molar ratio of the components for each polymer.

In some embodiments, the 6FDA-DAM/DABA polymer is 6FDA-DAM:DABA (3:2), where the 6FDA-DAM:DABA (3:2) has the formula:

where x and y are integers based on the ratio of DAM to DABA. In some embodiments, the polymer is a co-polyimide polymer including 6FDA-DAM:DABA. In some embodiments, the 6FDA-DAM:DABA is 6FDA-DAM:DABA (3:2). In some embodiments, the 6FDA-DAM:DABA is 6FDA-DAM:DABA (3:2) having a structure shown in FIG. 1A.

Metal Organic Framework (MOF) Fillers

The hybrid membranes of the present disclosure contain a metal organic framework (MOF) filler. In some embodiments, the MOF filler is a zirconium-based metal organic framework. In some embodiments, the MOF filler is UiO-66 or a functionalized UiO-66.

In some embodiments, the MOF filler is UiO-66.

In some embodiments, the MOF filler is a functionalized UiO-66.

In some embodiments, the functionalized UiO-66 is selected from UiO-66-FA, UiO-66-NH$_2$, and UiO-66-COOH. In some embodiments, the functionalized UiO-66 is UiO-66-FA. In some embodiments, the functionalized UiO-66 is UiO-66-NH$_2$. In some embodiments, the functionalized UiO-66 is UiO-66-COOH.

In some embodiments, the MOF filler is UiO-66-NH$_2$ or UiO-66-COOH. In some embodiments, the MOF filler is UiO-66-NH$_2$. In some embodiments, the MOF filler is UiO-66-COOH.

Figure 1B:
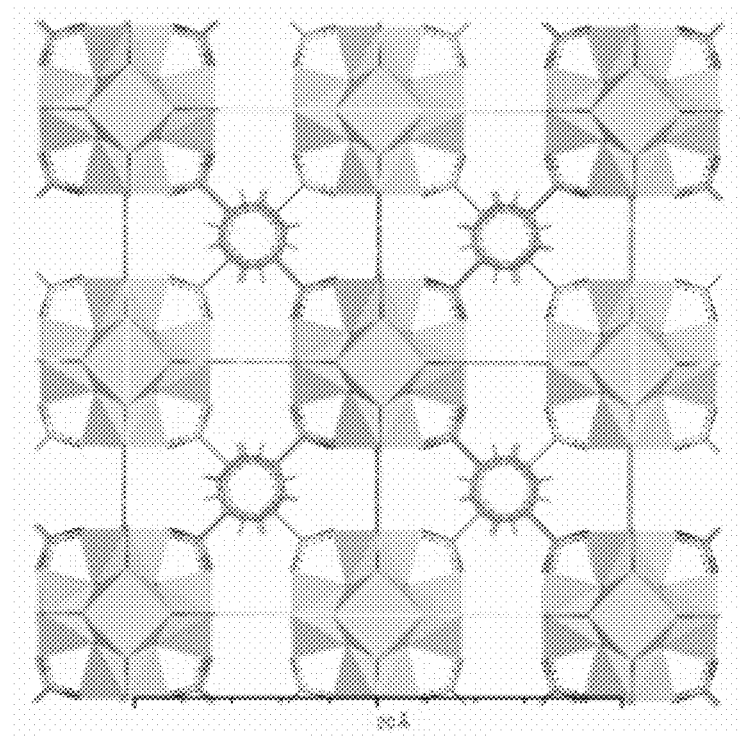
FIG. 1B shows the crystalline structure of UiO-66.
Figure 1C:
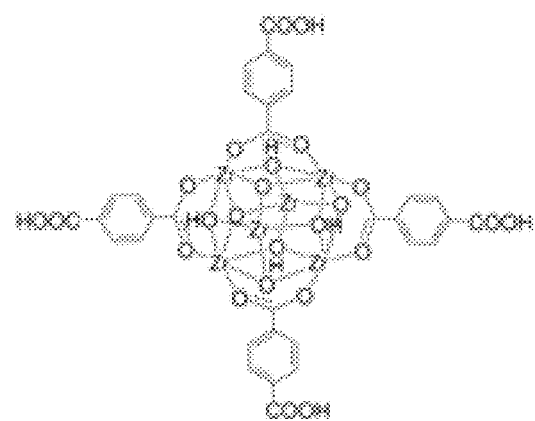
FIG. 1C shows the chemical structure of UiO-66.
Figure 1D:
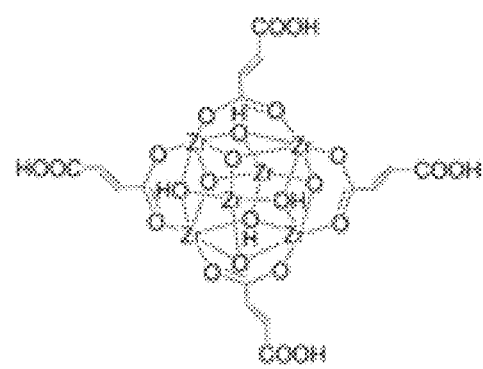
FIG. 1D shows the chemical structure of UiO-66-FA.
Figure 1E:
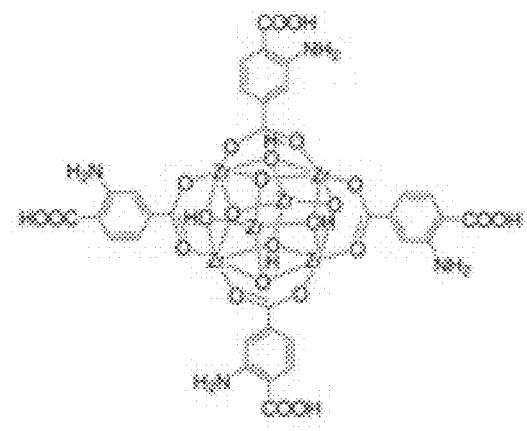
FIG. 1E shows the chemical structure of UiO-66-NH$_2$.
Figure 1F:
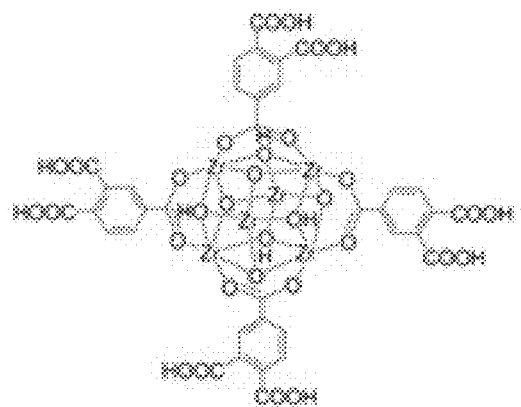
FIG. 1F shows the chemical structure of UiO-66-COOH.
Figure 2A:
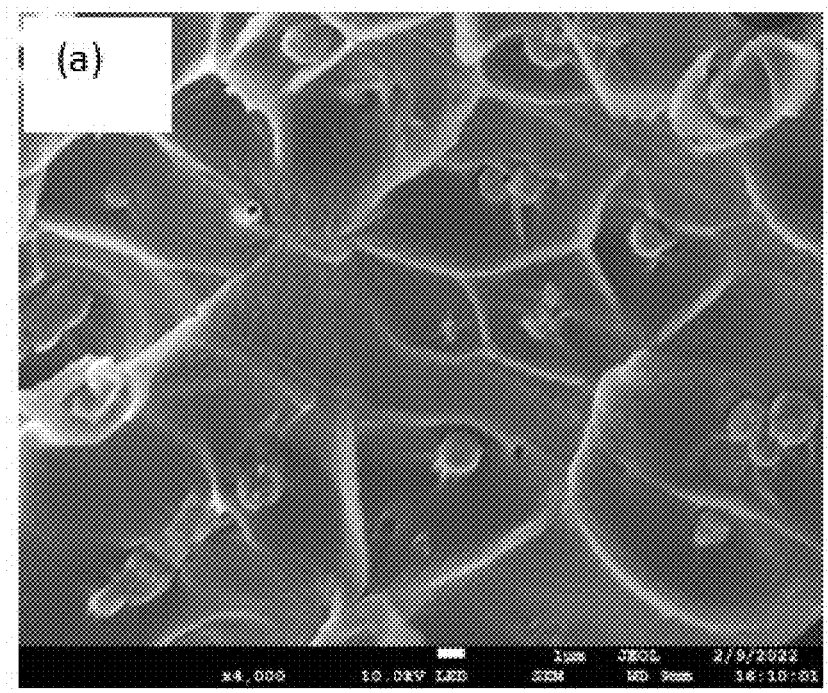
FIG. 2A shows SEM images of hybrid membranes using a 6FDA-DAM/DABA (3:2) matrix by incorporating 10 wt % of UiO-66 as MOF filler.
Figure 2B:
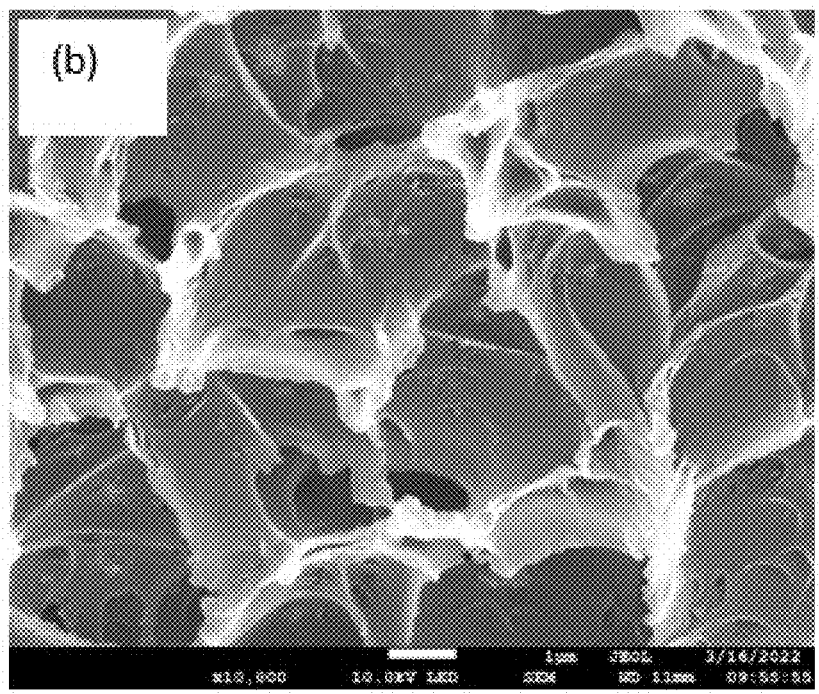
FIG. 2B shows SEM images of hybrid membranes using a 6FDA-DAM/DABA (3:2) matrix by incorporating 10 wt % of UiO-66-FA as MOF filler.
Figure 2C:
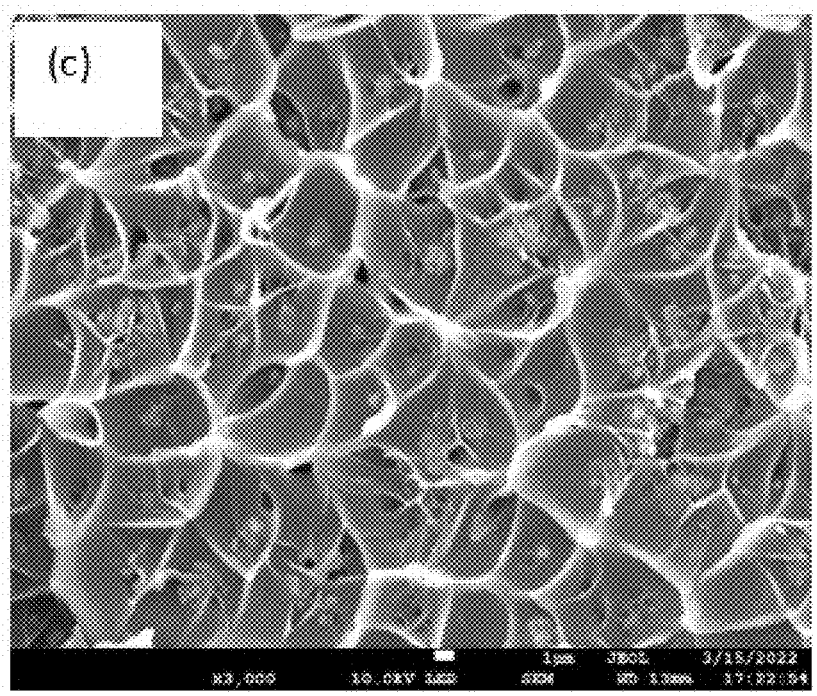
FIG. 2C shows SEM images of hybrid membranes using a 6FDA-DAM/DABA (3:2) matrix by incorporating 10 wt % of UiO-66-NH$_2$ as MOF
Figure 2D:
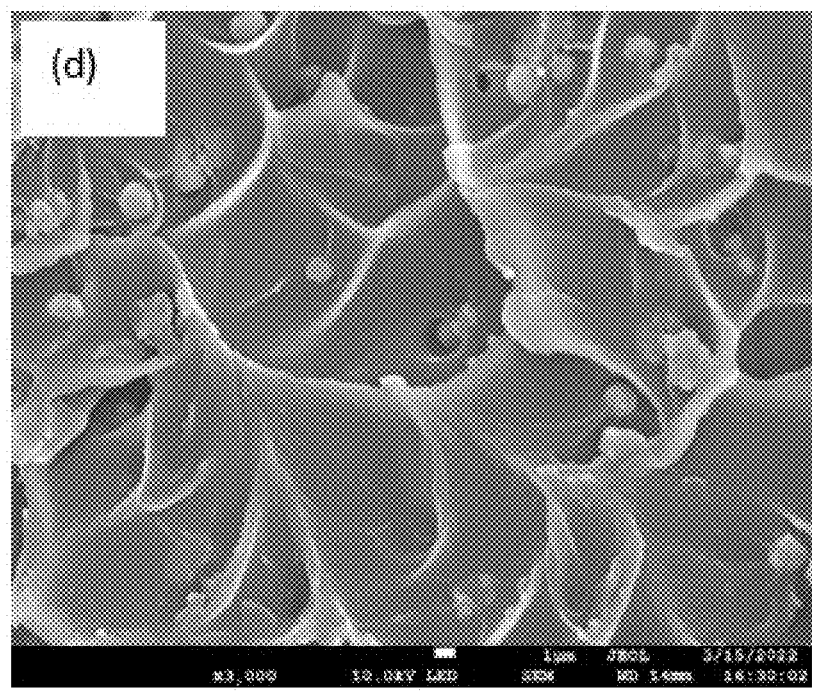
FIG. 2D shows SEM images of hybrid membranes using a 6FDA-DAM/DABA (3:2) matrix by incorporating 10 wt % of UiO-66-COOH as MOF filler.

In some embodiments, the UiO-66 has the chemical structure shown in FIG. 1C. In some embodiments, the UiO-66 is crystalline. In some embodiments, the UiO-66 has the crystalline structure shown in FIG. 1B. In some embodiments, the UiO-66 has the chemical and physical properties shown in Table 1. In some embodiments, the UiO-66 has a pore-aperture size of about 7.5 Å. In some embodiments, the UiO-66-FA has the chemical structure shown in FIG. 1D. In some embodiments, the UiO-66-FA has the chemical and physical properties shown in Table 1. In some embodiments, the UiO-66-FA has a pore-aperture size of about 3.3 to about 4.2 Å. In some embodiments, the UiO-66-NH$_2$ has the chemical structure shown in FIG. 1E. In some embodiments, the UiO-66-NH$_2$ has the chemical and physical properties shown in Table 1. In some embodiments, the UiO-66-NH$_2$ has a pore-aperture size of about 7.5 Å. In some embodiments, the UiO-66-COOH has the chemical structure shown in FIG. 1F. In some embodiments, the UiO-66-COOH has the chemical and physical properties shown in Table 1. In some embodiments, the UiO-66-COOH has a pore-aperture size of about 7.5 Å.

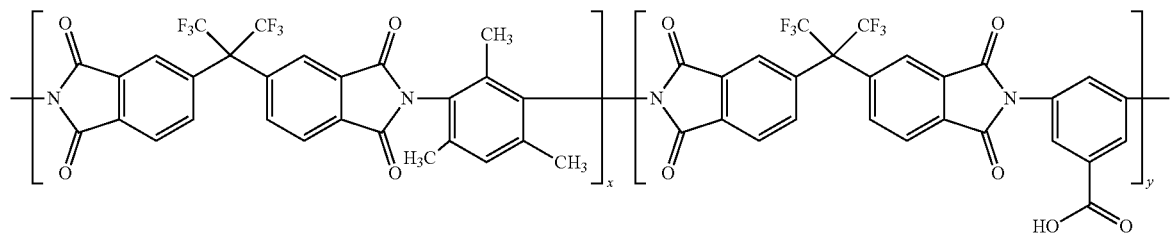

TABLE 1

Chemical and physical properties of UiO-66 and functionalized UiO-66.

| Name | Chemical Formula | Surface Area ($m^2/g$) | Pore volume ($cm^3/g$) | Thermal Stability (° C.) | Particle Size (μm) |
|---|---|---|---|---|---|
| UiO-66 | $C_{48}H_{28}O_{32}Zr_6$ | 1000-1600 | 0.3-0.5 | 400 | 0.2-0.5 |
| UiO-66-FA | $Zr_6O_4(OH)_4(C_4H_2O_4)_6$ | 720-770 | 0.29-0.32 | 200 | 0.1-0.5 |
| UiO-66-NH$_2$ | $Zr_6O_4(OH)_4(C_8H_5NO_4)x$, X = 5.4-6.0 | 800-1075 | 0.31-0.41 | 300 | 0.1-0.5 |
| UiO-66-COOH | $Zr_6O_4(OH)_4(C_9H_4O_6)x$, X = 5.4-6.0 | 550-600 | 0.25-0.27 | 350 | 0.2-0.5 |

Hybrid Membranes

The blended polymeric membranes of the present disclosure include a metal organic framework (MOF) filler and a polymer. In some embodiments, the hybrid membrane includes a metal organic framework (MOF) filler, where the MOF filler is a zirconium-based metal organic framework; and a polymer. In some embodiments, the hybrid membrane includes a metal organic framework (MOF) filler, where the MOF filler is UiO-66 or a functionalized UiO-66; and a polymer. In some embodiments, the hybrid membrane includes a metal organic framework (MOF) filler and a polymer, where the polymer is a co-polyimide polymer. In some embodiments, the hybrid membrane includes a metal organic framework (MOF) filler and a polymer, where the polymer is a 6FDA-DAM/DABA polymer. In some embodiments, the hybrid membrane includes a metal organic framework (MOF) filler, where the MOF filler is UiO-66 or a functionalized UiO-66; and a polymer, where the polymer is a 6FDA-DAM/DABA polymer.

In some embodiments, the MOF filler is about 1 wt % to about 25 wt %, about 3 wt % to about 20 wt %, about 5 wt % to about 15 wt %, about 7 wt % to about 13 wt %, or about 9 wt % to about 11 wt % of the hybrid membrane. In some embodiments, the MOF filler is about 1 wt % to about 25 wt % of the hybrid membrane. In some embodiments, the MOF filler is about 3 wt % to about 20 wt % of the hybrid membrane. In some embodiments, the MOF filler is about 5 wt % to about 15 wt % of the hybrid membrane. In some embodiments, the MOF filler is about 7 wt % to about 13 wt % of the hybrid membrane. In some embodiments, the MOF filler is about 9 wt % to about 11 wt % of the hybrid membrane.

In some embodiments, the MOF filler is about 1 wt % of the hybrid membrane. In some embodiments, the MOF filler is about 3 wt % of the hybrid membrane. In some embodiments, the MOF filler is about 5 wt % of the hybrid membrane. In some embodiments, the MOF filler is about 7 wt % of the hybrid membrane. In some embodiments, the MOF filler is about 9 wt % of the hybrid membrane. In some embodiments, the MOF filler is about 10 wt % of the hybrid membrane. In some embodiments, the MOF filler is about 11 wt % of the hybrid membrane. In some embodiments, the MOF filler is about 13 wt % of the hybrid membrane. In some embodiments, the MOF filler is about 15 wt % of the hybrid membrane. In some embodiments, the MOF filler is about 20 wt % of the hybrid membrane. In some embodiments, the MOF filler is about 25 wt % of the hybrid membrane.

In some embodiments, the polymer is about 75 wt % to about 99 wt %, about 80 wt % to about 97 wt %, about 85 wt % to about 95 wt %, about 87 wt % to about 93 wt %, or about 89 wt % to about 91 wt % of the hybrid membrane. In some embodiments, the polymer is about 75 wt % to about 99 wt % of the hybrid membrane. In some embodiments, the polymer is about 80 wt % to about 97 wt % of the hybrid membrane. In some embodiments, the polymer is about 85 wt % to about 95 wt % of the hybrid membrane. In some embodiments, the polymer is about 87 wt % to about 93 wt % of the hybrid membrane. In some embodiments, the polymer is about 89 wt % to about 91 wt % of the hybrid membrane.

In some embodiments, the polymer is about 75 wt % of the hybrid membrane. In some embodiments, the polymer is about 80 wt % of the hybrid membrane. In some embodiments, the polymer is about 85 wt % of the hybrid membrane. In some embodiments, the polymer is about 87 wt % of the hybrid membrane. In some embodiments, the polymer is about 89 wt % of the hybrid membrane. In some embodiments, the polymer is about 90 wt % of the hybrid membrane. In some embodiments, the polymer is about 91 wt % of the hybrid membrane. In some embodiments, the polymer is about 93 wt % of the hybrid membrane. In some embodiments, the polymer is about 95 wt % of the hybrid membrane. In some embodiments, the polymer is about 99 wt % of the hybrid membrane.

In some embodiments, the polymer is 6FDA-DAM:DABA (3:2) and the MOF filler is selected from UiO-66, UiO-66-FA, UiO-66-NH$_2$, and UiO-66-COOH. In some embodiments, the polymer is 6FDA-DAM:DABA (3:2) and the MOF filler is UiO-66. In some embodiments, the polymer is 6FDA-DAM:DABA (3:2) and the MOF filler is UiO-66-FA. In some embodiments, the polymer is 6FDA-DAM:DABA (3:2) and the MOF filler is UiO-66-NH$_2$. In some embodiments, polymer is 6FDA-DAM:DABA (3:2) and the MOF filler is UiO-66-COOH.

In some embodiments, the MOF filler is about 1 wt % to about 25 wt % of the hybrid membrane and the polymer is about 75 wt % to about 99 wt % of the hybrid membrane. In some embodiments, the MOF filler is about 3 wt % to about 20 wt % of the hybrid membrane and the polymer is about 80 wt % to about 97 wt % of the hybrid membrane. In some embodiments, the MOF filler is about 5 wt % to about 15 wt % of the hybrid membrane and the polymer is about 85 wt % to about 95 wt % of the hybrid membrane. In some embodiments, the MOF filler is about 7 wt % to about 13 wt % of the hybrid membrane and the polymer is about 87 wt % to about 93 wt % of the hybrid membrane. In some embodiments, the MOF filler is about 9 wt % to about 11 wt % of the hybrid membrane and the polymer is about 89 wt % to about 91 wt % of the hybrid membrane.

In some embodiments, the MOF filler is about 1 wt % of the hybrid membrane and the polymer is about 99 wt % of the hybrid membrane. In some embodiments, the MOF filler is about 3 wt % of the hybrid membrane and the polymer is about 97 wt % of the hybrid membrane. In some embodiments, the MOF filler is about 5 wt % of the hybrid membrane and the polymer is about 95 wt % of the hybrid membrane. In some embodiments, the MOF filler is about 7 wt % of the hybrid membrane and the polymer is about 93 wt % of the hybrid membrane. In some embodiments, the MOF filler is about 9 wt % of the hybrid membrane and the polymer is about 91 wt % of the hybrid membrane. In some embodiments, the MOF filler is about 10 wt % of the hybrid membrane and the polymer is about 90 wt % of the hybrid membrane. In some embodiments, the MOF filler is about 11 wt % of the hybrid membrane and the polymer is about 89 wt % of the hybrid membrane. In some embodiments, the MOF filler is about 13 wt % of the hybrid membrane and the polymer is about 87 wt % of the hybrid membrane. In some embodiments, the MOF filler is about 15 wt % of the hybrid membrane and the polymer is about 85 wt % of the hybrid membrane. In some embodiments, the MOF filler is about 20 wt % of the hybrid membrane and the polymer is about 80 wt % of the hybrid membrane. In some embodiments, the MOF filler is about 25 wt % of the hybrid membrane and the polymer is about 75 wt % of the hybrid membrane.

In some embodiments, the UiO-66 is about 5 wt % to about 15 wt % of the hybrid membrane and the 6FDA-DAM/DABA (3:2) is about 85 wt % to about 95 wt % of the hybrid membrane. In some embodiments, the UiO-66 is about 10 wt % of the hybrid membrane and the 6FDA-DAM/DABA (3:2) is about 90 wt % of the hybrid membrane.

In some embodiments, the UiO-66-FA is about 5 wt % to about 15 wt % of the hybrid membrane and the 6FDA-DAM/DABA (3:2) is about 85 wt % to about 95 wt % of the hybrid membrane. In some embodiments, the UiO-66-FA is about 10 wt % of the hybrid membrane and the 6FDA-DAM/DABA (3:2) is about 90 wt % of the hybrid membrane.

In some embodiments, the UiO-66-$NH_2$ is about 5 wt % to about 15 wt % of the hybrid membrane and the 6FDA-DAM/DABA (3:2) is about 85 wt % to about 95 wt % of the hybrid membrane. In some embodiments, the UiO-66-$NH_2$ is about 10 wt % of the hybrid membrane and the 6FDA-DAM/DABA (3:2) is about 90 wt % of the hybrid membrane.

In some embodiments, the UiO-66-COOH is about 5 wt % to about 15 wt % of the hybrid membrane and the 6FDA-DAM/DABA (3:2) is about 85 wt % to about 95 wt % of the hybrid membrane. In some embodiments, the UiO-66-COOH is about 10 wt % of the hybrid membrane and the 6FDA-DAM/DABA (3:2) is about 90 wt % of the hybrid membrane.

In some embodiments, the hybrid membrane exhibits an $H_2S$-permeability increase of about 20% to about 140% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits an $H_2S$-permeability increase of about 100% to about 140% at a pressure of 200 psig as compared to the same polyimide-based membrane that does not include a metal organic framework (MOF) filler that is UiO-66 or functionalized UiO-66.

In some embodiments, the hybrid membrane exhibits an $H_2S/CH_4$ selectivity increase of about 20% to about 50% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits an $H_2S/CH_4$ selectivity increase of about 30% to about 50% at a pressure of 200 psig as compared to the same polyimide-based membrane that does not include a metal organic framework (MOF) filler that is UiO-66 or functionalized UiO-66.

In some embodiments, the hybrid membrane exhibits:
(i) an $H_2S$-permeability increase of about 20% to about 140%; and
(ii) an $H_2S/CH_4$ selectivity increase of about 20% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the hybrid membrane exhibits:
(i) an $H_2S$-permeability increase of about 100% to about 140%; and
(ii) an $H_2S/CH_4$ selectivity increase of about 30% to about 50%;
at a pressure of 200 psig as compared to the same polyimide-based membrane that does not include a metal organic framework (MOF) filler that is UiO-66 or functionalized UiO-66.

In some embodiments, the hybrid membrane exhibits a $CO_2$-permeability increase of about 15% to about 150% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits a $CO_2$-permeability increase of about 100% to about 150% at a pressure of 200 psig as compared to the same polyimide-based membrane that does not include a metal organic framework (MOF) filler that is UiO-66 or functionalized UiO-66.

In some embodiments, the hybrid membrane exhibits a $CO_2/CH_4$ selectivity increase of about 15% to about 50% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits a $CO_2/CH_4$ selectivity increase of about 35% to about 50% at a pressure of 200 psig as compared to the same polyimide-based membrane that does not include a metal organic framework (MOF) filler that is UiO-66 or functionalized UiO-66.

In some embodiments, the hybrid membrane exhibits:
(i) a $CO_2$-permeability increase of about 15% to about 150%; and
(ii) a $CO_2/CH_4$ selectivity increase of about 15% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the hybrid membrane exhibits:
(i) a $CO_2$-permeability increase of about 100% to about 150%; and
(ii) a $CO_2/CH_4$ selectivity increase of about 35% to about 50%;
at a pressure of 200 psig as compared to the same polyimide-based membrane that does not include a metal organic framework (MOF) filler that is UiO-66 or functionalized UiO-66.

In some embodiments, the hybrid membrane exhibits:
(i) an $H_2S$-permeability increase of about 20% to about 140%;
(ii) an $H_2S/CH_4$ selectivity increase of about 20% to about 50%;
(iii) a $CO_2$-permeability increase of about 15% to about 150%; and
(iv) a $CO_2/CH_4$ selectivity increase of about 15% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the hybrid membrane exhibits:
(i) an $H_2S$-permeability increase of about 100% to about 140%;
(ii) an $H_2S/CH_4$ selectivity increase of about 30% to about 50%;
(iii) a $CO_2$-permeability increase of about 100% to about 150%; and
(iv) a $CO_2/CH_4$ selectivity increase of about 35% to about 50%;
at a pressure of 200 psig as compared to the same polyimide-based membrane that does not include a metal organic framework (MOF) filler that is UiO-66 or functionalized UiO-66.

In some embodiments, the hybrid membrane exhibits an $H_2S$-permeability increase of about 1% to about 95% at a pressure of 500 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits an $H_2S$-permeability increase of about 75% to about 95% at a pressure of 500 psig as compared to the same polyimide-based membrane that does not include a metal organic framework (MOF) filler that is UiO-66 or functionalized UiO-66.

In some embodiments, the hybrid membrane exhibits an $H_2S/CH_4$ selectivity increase of up to about 55% at a pressure of 500 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits an $H_2S/CH_4$ selectivity increase of about 34% to about 55% at a pressure of 500 psig as compared to the same polyimide-based membrane that does not include a metal organic framework (MOF) filler that is UiO-66 or functionalized UiO-66.

In some embodiments, the hybrid membrane exhibits:
(i) an $H_2S$-permeability increase of about 1% to about 95%; and
(ii) an $H_2S/CH_4$ selectivity increase of up to about 55%;
at a pressure of 500 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the hybrid membrane exhibits:
(i) an $H_2S$-permeability increase of about 75% to about 95%; and
(ii) an $H_2S/CH_4$ selectivity increase of about 30% to about 55%;
at a pressure of 500 psig as compared to the same polyimide-based membrane that does not include a metal organic framework (MOF) filler that is UiO-66 or functionalized UiO-66.

In some embodiments, the hybrid membrane exhibits a $CO_2$-permeability increase of up to about 75% at a pressure of 500 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the hybrid membrane exhibits a $CO_2$-permeability increase of about 30% to about 75% at a pressure of 500 psig as compared to the same polyimide-based membrane that does not include a metal organic framework (MOF) filler that is UiO-66 or functionalized UiO-66.

In some embodiments, the MOF filler is UiO-66-COOH and the hybrid membrane exhibits a $CO_2/CH_4$ selectivity increase of up about 6% at a pressure of 500 psig as compared to the same polyimide-based membrane that does not include a metal organic framework (MOF) filler that is UiO-66 or functionalized UiO-66.

In some embodiments, the MOF filler is UiO-66-COOH and the hybrid membrane exhibits:
(i) a $CO_2$-permeability increase of about 30% to about 75%; and
(ii) a $CO_2/CH_4$ selectivity increase of about 6%;
at a pressure of 500 psig as compared to the same polyimide-based membrane that does not include a metal organic framework (MOF) filler that is UiO-66 or functionalized UiO-66.

In some embodiments, the hybrid membrane exhibits:
(i) an $H_2S$-permeability increase of about 1% to about 95%;
(ii) an $H_2S/CH_4$ selectivity increase of up to about 55%; and
(iii) a $CO_2$-permeability increase of up to about 75%;
at a pressure of 500 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the hybrid membrane exhibits:
(i) an $H_2S$-permeability increase of about 75% to about 95%;
(ii) an $H_2S/CH_4$ selectivity increase of about 30% to about 55%; and
(iii) a $CO_2$-permeability increase of about 30% to about 75%;
at a pressure of 500 psig as compared to the same polyimide-based membrane that does not include a metal organic framework (MOF) filler that is UiO-66 or functionalized UiO-66.

Methods of Preparing Blended Hybrid Membranes

Also provided are methods of preparing the hybrid membranes of the present disclosure. In some embodiments, provided is a process of making a hybrid membranes that can be used for industrial gas processing, having a combination of high permeability and high selectivity. In some embodiments, the hybrid membranes include a metal organic framework (MOF) filler and a polymer. In some embodiments, the hybrid membrane includes a metal organic framework (MOF) filler, where the MOF filler is a zirconium-based metal organic framework; and a polymer. In some embodiments, the hybrid membrane includes a metal organic framework (MOF) filler, where the MOF filler is UiO-66 or a functionalized UiO-66; and a polymer. In some embodiments, the hybrid membrane includes a metal organic framework (MOF) filler and a polymer, where the polymer is a co-polyimide polymer. In some embodiments, the hybrid membrane includes a metal organic framework (MOF) filler and a polymer, where the polymer is a 6FDA-DAM/DABA polymer. In some embodiments, the hybrid membrane includes a metal organic framework (MOF) filler, where the MOF filler is UiO-66 or a functionalized UiO-66; and a polymer, where the polymer is a 6FDA-DAM/DABA polymer.

In some embodiments, the method of preparing a hybrid membrane, includes:

providing a polymer solution including a first solvent and a polymer, which is a 6FDA-DAM/DABA polymer;

combining the polymer solution with a metal organic framework (MOF) filler solution including a second solvent and a metal organic framework (MOF) filler, where the MOF filler is UiO-66 or functionalized UiO-66, to form a MOF-polymer solution, including a third solvent;

evaporating the third solvent to form a hybrid membrane film; and drying the hybrid membrane film to form the hybrid membrane.

In some embodiments, the polymer solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of the polymer. In some embodiments, the polymer solution includes about 0.1 wt % to about 25 wt % of the polymer. In some embodiments, the polymer solution includes about 1 wt % to about 20 wt % of the polymer. In some embodiments, the polymer solution includes about 2 wt % to about 15 wt % of the polymer. In some embodiments, the polymer solution includes about 3 wt % to about 10 wt % of the polymer. In some embodiments, the polymer solution includes about 4 wt % to about 8 wt % of the polymer. In some embodiments, the polymer solution includes about 4.5 wt % to about 5.5 wt % of the polymer.

In some embodiments, the polymer solution includes about 0.1 wt % of the polymer. In some embodiments, the polymer solution includes about 1 wt % of the polymer. In some embodiments, the polymer solution includes about 2 wt % of the polymer. In some embodiments, the polymer solution includes about 3 wt % of the polymer. In some embodiments, the polymer solution includes about 4 wt % of the polymer. In some embodiments, the polymer solution includes about 4.5 wt % of the polymer. In some embodiments, the polymer solution includes about 5 wt % of the polymer. In some embodiments, the polymer solution includes about 5.5 wt % of the polymer. In some embodiments, the polymer solution includes about 8 wt % of the polymer. In some embodiments, the polymer solution includes about 10 wt % of the polymer. In some embodiments, the polymer solution includes about 15 wt % of the polymer. In some embodiments, the polymer solution includes about 20 wt % of the polymer. In some embodiments, the polymer solution includes about 25 wt % of the polymer.

In some embodiments, the polymer solution includes a co-polyimide polymer. In some embodiments, the polymer solution includes a 4,4'-(hexafluoroisopropylidene) diphthalic anhydride (6FDA)-2,4,6-trimethyl-1,3-diaminobenzene (DAM)/3,5-diaminobenzoic acid (DABA) (6FDA-DAM/DABA). In some embodiments, the polymer solution includes 6FDA-DAM:DABA (3:2).

In some embodiments, the polymer solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of 6FDA-DAM:DABA (3:2).

In some embodiments, the polymer solution includes about 5 wt % of 6FDA-DAM:DABA (3:2).

In some embodiments, the first solvent is selected from ethanol, butanol, 2-ethylhexanol, isobutanol, isopropanol, methanol, propanol, propylene glycol, dimethylformamide, pyridine, n-hexane, cyclohexane, acetone, methyl ethyl ketone, methyl isobutyl ketone, methyl isopropyl ketone, mesityl oxide, trichloroethylene, 1,4-dioxane, butyl ether, ethyl ether, diisopropyl ether, tetrahydrofuran, tert-butyl methyl ether, acetonitrile, water, ethylene bromide, chloroform, ethylene chloride, dichloromethane, tetrachloroethylene, carbon tetrachloride, dimethyl sulfoxide, ethyl acetate, toluene, xylenes, and combinations thereof. In some embodiments, the first solvent is tetrahydrofuran.

In some embodiments, the polymer solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of 6FDA-DAM:DABA (3:2), where the first solvent is tetrahydrofuran.

In some embodiments, the polymer solution includes about 5 wt % of 6FDA-DAM:DABA (3:2), where the first solvent is tetrahydrofuran.

In some embodiments, the MOF filler solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of the MOF filler. In some embodiments, the MOF filler solution includes about 0.1 wt % to about 25 wt % of the MOF filler. In some embodiments, the MOF filler solution includes about 1 wt % to about 20 wt % of the MOF filler. In some embodiments, the MOF filler solution includes about 2 wt % to about 15 wt % of the MOF filler. In some embodiments, the MOF filler solution includes about 3 wt % to about 10 wt % of the MOF filler. In some embodiments, the MOF filler solution includes about 4 wt % to about 8 wt % of the MOF filler. In some embodiments, the MOF filler solution includes about 4.5 wt % to about 5.5 wt % of the MOF filler.

In some embodiments, the MOF filler solution includes about 0.1 wt % of the MOF filler. In some embodiments, the MOF filler solution includes about 1 wt % of the MOF filler. In some embodiments, the MOF filler solution includes about 2 wt % of the MOF filler. In some embodiments, the MOF filler solution includes about 3 wt % of the MOF filler. In some embodiments, the MOF filler solution includes about 4 wt % of the MOF filler. In some embodiments, the MOF filler solution includes about 4.5 wt % of the MOF filler. In some embodiments, the MOF filler solution includes about 5 wt % of the MOF filler. In some embodiments, the MOF filler solution includes about 5.5 wt % of the MOF filler. In some embodiments, the MOF filler solution includes about 8 wt % of the MOF filler. In some embodiments, the MOF filler solution includes about 10 wt % of the MOF filler. In some embodiments, the MOF filler solution includes about 15 wt % of the MOF filler. In some embodiments, the MOF filler solution includes about 20 wt % of the MOF filler. In some embodiments, the MOF filler solution includes about 25 wt % of the MOF filler.

In some embodiments, the MOF filler solution includes a zirconium-based metal organic framework (MOF) filler. In some embodiments, the MOF filler solution includes a MOF filler selected from UiO-66 and functionalized UiO-66. In some embodiments, the MOF filler solution includes a MOF filler selected from UiO-66-FA, UiO-66-NH$_2$, and UiO-66-

COOH. In some embodiments, the MOF filler solution includes UiO-66. In some embodiments, the MOF filler solution includes UiO-66-FA. In some embodiments, the MOF filler solution includes UiO-66-NH$_2$. In some embodiments, the MOF filler solution includes UiO-66-COOH.

In some embodiments, the MOF filler solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of MOF filler selected from UiO-66, UiO-66-FA, UiO-66-NH$_2$, and UiO-66-COOH.

In some embodiments, the MOF filler solution includes about 5 wt % of MOF filler selected from UiO-66, UiO-66-FA, UiO-66-NH$_2$, and UiO-66-COOH.

In some embodiments, the second solvent is selected from ethanol, butanol, 2-ethylhexanol, isobutanol, isopropanol, methanol, propanol, propylene glycol, dimethylformamide, pyridine, n-hexane, cyclohexane, acetone, methyl ethyl ketone, methyl isobutyl ketone, methyl isopropyl ketone, mesityl oxide, trichloroethylene, 1,4-dioxane, butyl ether, ethyl ether, diisopropyl ether, tetrahydrofuran, tert-butyl methyl ether, acetonitrile, water, ethylene bromide, chloroform, ethylene chloride, dichloromethane, tetrachloroethylene, carbon tetrachloride, dimethyl sulfoxide, ethyl acetate, toluene, xylenes, and combinations thereof. In some embodiments, the second solvent is tetrahydrofuran.

In some embodiments, the MOF filler solution includes about 0.1 wt % to about 25 wt %, about 1 wt % to about 20 wt %, about 2 wt % to about 15 wt %, about 3 wt % to about 10 wt %, about 4 wt % to about 8 wt %, or about 4.5 wt % to about 5.5 wt % of MOF filler selected from UiO-66, UiO-66-FA, UiO-66-NH$_2$, and UiO-66-COOH., where the second solvent is tetrahydrofuran.

In some embodiments, the MOF filler solution includes about 5 wt % of MOF filler selected from UiO-66, UiO-66-FA, UiO-66-NH$_2$, and UiO-66-COOH, where the second solvent is tetrahydrofuran.

In some embodiments, combining the polymer solution with a metal organic framework (MOF) filler solution including a second solvent and a metal organic framework (MOF) filler includes mixing the MOF-polymer solution. In some embodiments, the mixing is performed for about 5 minutes. In some embodiments, the mixing is performed for about 15 minutes. In some embodiments, the mixing is performed for about 30 minutes. In some embodiments, the mixing is performed for about 1 hour. In some embodiments, the mixing is performed for about 2 hours. In some embodiments, the mixing is performed for about 4 hours. In some embodiments, the mixing is performed for about 6 hours. In some embodiments, the mixing is performed for about 8 hours. In some embodiments, the mixing is performed for about 10 hours. In some embodiments, the mixing is performed for about 12 hours. In some embodiments, the mixing is performed for about 14 hours. In some embodiments, the mixing is performed for about 16 hours. In some embodiments, the mixing is performed for about 18 hours. In some embodiments, the mixing is performed for about 20 hours. In some embodiments, the mixing is performed for about 24 hours. In some embodiments, the mixing is performed for about 48 hours. In some embodiments, the mixing is performed for about 72 hours. In some embodiments, the mixing is performed for about 96 hours. In some embodiments, the mixing is performed overnight.

In some embodiments, the mixing is performed on a roller mixer.

In some embodiments, the mixing is performed on a roller mixer for about 16 hours. In some embodiments, the mixing is performed on a roller mixer for about 18 hours. In some embodiments, the mixing is performed on a roller mixer overnight.

In some embodiments, the third solvent is selected from ethanol, butanol, 2-ethylhexanol, isobutanol, isopropanol, methanol, propanol, propylene glycol, dimethylformamide, pyridine, n-hexane, cyclohexane, acetone, methyl ethyl ketone, methyl isobutyl ketone, methyl isopropyl ketone, mesityl oxide, trichloroethylene, 1,4-dioxane, butyl ether, ethyl ether, diisopropyl ether, tetrahydrofuran, tert-butyl methyl ether, acetonitrile, water, ethylene bromide, chloroform, ethylene chloride, dichloromethane, tetrachloroethylene, carbon tetrachloride, dimethyl sulfoxide, ethyl acetate, toluene, xylenes, and combinations thereof. In some embodiments, the third solvent is tetrahydrofuran.

In some embodiments, the hybrid membrane film has a thickness of about 25 μm to about 150 μm, about 50 μm to about 125 μm, about 60 μm to about 110 μm, about 65 μm to about 100 μm, or about 70 μm to about 90 μm. In some embodiments, the hybrid membrane film has a thickness of about 25 μm to about 150 μm. In some embodiments, the hybrid membrane film has a thickness of about 50 μm to about 125 μm. In some embodiments, the hybrid membrane film has a thickness of about 60 μm to about 110 μm. In some embodiments, the hybrid membrane film has a thickness of about 65 μm to about 100 μm. In some embodiments, the hybrid membrane film has a thickness of about 70 μm to about 90 μm.

In some embodiments, the drying is performed under reduced pressure.

In some embodiments, the drying is performed for about 5 minutes. In some embodiments, the drying is performed for about 15 minutes. In some embodiments, the drying is performed for about 30 minutes. In some embodiments, the drying is performed for about 1 hour. In some embodiments, the drying is performed for about 2 hours. In some embodiments, the drying is performed for about 4 hours. In some embodiments, the drying is performed for about 6 hours. In some embodiments, the drying is performed for about 8 hours. In some embodiments, the drying is performed for about 10 hours. In some embodiments, the drying is performed for about 12 hours. In some embodiments, the drying is performed for about 14 hours. In some embodiments, the drying is performed for about 16 hours. In some embodiments, the drying is performed for about 18 hours. In some embodiments, the drying is performed for about 20 hours. In some embodiments, the drying is performed for about 24 hours. In some embodiments, the drying is performed for about 48 hours. In some embodiments, the drying is performed for about 72 hours. In some embodiments, the drying is performed for about 96 hours. In some embodiments, the drying is performed overnight.

In some embodiments, the drying is performed at about 100° C. to about 300° C. In some embodiments, the drying is performed at about 120° C. to about 280° C. In some embodiments, the drying is performed at about 140° C. to about 260° C. In some embodiments, the drying is performed at about 160° C. to about 240° C. In some embodiments, the drying is performed at about 180° C. to about 220° C. In some embodiments, the drying is performed at about 190° C. to about 210° C. In some embodiments, the drying is performed at about 200° C.

In some embodiments, the drying is performed under reduced pressure at about 200° C.

In some embodiments, the drying is performed under reduced pressure for about 24 hours.

In some embodiments, the drying is performed at about 200° C. for about 24 hours.

In some embodiments, the drying is performed under reduced pressure at about 200° C. for about 24 hours.

Also provided in the present disclosure are hybrid membranes prepared by the methods described herein.

Methods of Using the Hybrid Membranes

Hybrid membranes are thin semipermeable barriers that selectively separate some gas compounds from others. The hybrid membranes are dense films that do not operate as a filter, but rather separate gas compounds based on how well the different compounds dissolve into the membrane and diffuse through it (the solution-diffusion model). The hybrid membranes of the present disclosure can be used for any gas separation application, including, but not limited to, natural gas sweetening, oxygen enrichment, hydrogen purification, and nitrogen and organic compounds removal from natural gas. In some embodiments, the membranes of the present disclosure are used for the bulk removal of acid gases from natural gas.

In some embodiments, the blended polymeric membranes of the present disclosure display improved membrane separation performance as compared to the same polyimide-based membrane that does not include a metal organic framework (MOF) filler that is UiO-66 or functionalized UiO-66. In some embodiments, the blended polymeric membranes of the present disclosure display improved gas transport properties in natural gas separation as to the same polyimide-based membrane that does not include a metal organic framework (MOF) filler that is UiO-66 or functionalized UiO-66. In some embodiments, the hybrid membranes of the present disclosure exhibit one or more of high $CO_2$ permeability, high $CO_2/CH_4$ selectivity, high $H_2S$ permeability, and high $H_2S/CH_4$ selectivity compared to the same polyimide-based membrane that does not include a metal organic framework (MOF) filler that is UiO-66 or functionalized UiO-66.

In some embodiments, the method of separating at least one impurity from natural gas, includes:
providing a hybrid membrane including:
a metal organic framework (MOF) filler, where the MOF filler is UiO-66 or functionalized UiO-66; and
a polymer, where the polymer is a 6FDA-DAM/DABA polymer;
introducing a natural gas stream to the hybrid membrane; and
removing at least one impurity from the natural gas.

In some embodiments, the 6FDA-DAM/DABA polymer is 6FDA-DAM:DABA (3:2).

In some embodiments, the MOF filler is UiO-66. In some embodiments, the MOF filler is a functionalized UiO-66. In some embodiments, the functionalized MOF filler is selected from UiO-66-FA, UiO-66-$NH_2$, and UiO-66-COOH. In some embodiments, the functionalized MOF filler is UiO-66-FA. In some embodiments, the functionalized MOF filler is UiO-66-$NH_2$. In some embodiments, the functionalized MOF filler is UiO-66-COOH.

In some embodiments, the 6FDA-DAM/DABA polymer is 6FDA-DAM:DABA (3:2) and the MOF filler is selected from UiO-66, UiO-66-FA, UiO-66-$NH_2$, and UiO-66-COOH. In some embodiments, the 6FDA-DAM/DABA polymer is 6FDA-DAM:DABA (3:2) and the MOF filler is UiO-66. In some embodiments, the 6FDA-DAM/DABA polymer is 6FDA-DAM:DABA (3:2) and the MOF filler is UiO-66-FA. In some embodiments, the 6FDA-DAM/DABA polymer is 6FDA-DAM:DABA (3:2) and the MOF filler is UiO-66-$NH_2$. In some embodiments, the 6FDA-DAM/DABA polymer is 6FDA-DAM:DABA (3:2) and the MOF filler is UiO-66-COOH.

In some embodiments, the impurity is selected from hydrogen sulfide ($H_2S$), carbon dioxide ($CO_2$), ethane ($C_2H_6$), nitrogen ($N_2$), $C_3+$ hydrocarbons, water ($H_2O$), and combinations thereof. In some embodiments, the impurity is hydrogen sulfide ($H_2S$). In some embodiments, the impurity is carbon dioxide ($CO_2$). In some embodiments, the impurity is ethane ($C_2H_6$). In some embodiments, the impurity is nitrogen ($N_2$). In some embodiments, the impurity is $C_3+$ hydrocarbons. In some embodiments, the $C_3+$ hydrocarbons include propane, n-butane, isopropane, n-pentane, isobutane, propylene, propyne, 1,3-butadiene, isobutylene, butyne, pentene, pentyne, and combinations thereof. In some embodiments, the impurity is water ($H_2O$). In some embodiments, the impurity is a combination of hydrogen sulfide ($H_2S$) and carbon dioxide ($CO_2$). In some embodiments, the impurity is a combination of hydrogen sulfide ($H_2S$), carbon dioxide ($CO_2$), ethane ($C_2H_6$), and nitrogen ($N_2$).

In some embodiments, the method exhibits an $H_2S$-permeability increase of about 20% to about 140% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the method exhibits an $H_2S$-permeability increase of about 100% to about 140% at a pressure of 200 psig as compared to the same polyimide-based membrane that does not include a metal organic framework (MOF) filler that is UiO-66 or functionalized UiO-66.

In some embodiments, the method exhibits an $H_2S/CH_4$ selectivity increase of about 20% to about 50% at a pressure of 200 psig as compared to the same polyimide-based membrane that does not include a metal organic framework (MOF) filler that is UiO-66 or functionalized UiO-66. In some embodiments, the MOF filler is UiO-66-$NH_2$ or UiO-66-COOH and the method exhibits an $H_2S/CH_4$ selectivity increase of about 30% to about 50% at a pressure of 200 psig as compared to the same polyimide-based membrane that does not include a metal organic framework (MOF) filler that is UiO-66 or functionalized UiO-66.

In some embodiments, the method exhibits:
(i) an $H_2S$-permeability increase of about 20% to about 140%; and
(ii) an $H_2S/CH_4$ selectivity increase of about 20% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the method exhibits:
(i) an $H_2S$-permeability increase of about 100% to about 140%; and
(ii) an $H_2S/CH_4$ selectivity increase of about 30% to about 50%;
at a pressure of 200 psig as compared to the same polyimide-based membrane that does not include a metal organic framework (MOF) filler that is UiO-66 or functionalized UiO-66.

In some embodiments, the method exhibits a $CO_2$-permeability increase of about 15% to about 150% at a pressure of 200 psig as compared to the same polyimide-based membrane that does not include a metal organic framework (MOF) filler that is UiO-66 or functionalized UiO-66. In some embodiments, the MOF filler is UiO-66-NH$_2$ or UiO-66-COOH and the method exhibits a CO$_2$-permeability increase of about 100% to about 150% at a pressure of 200 psig as compared to the same polyimide-based membrane that does not include a metal organic framework (MOF) filler that is UiO-66 or functionalized UiO-66.

In some embodiments, the method exhibits a CO$_2$/CH$_4$ selectivity increase of about 15% to about 50% at a pressure of 200 psig as compared to the same polyimide-based membrane that does not include a metal organic framework (MOF) filler that is UiO-66 or functionalized UiO-66. In some embodiments, the MOF filler is UiO-66-NH$_2$ or UiO-66-COOH and the method exhibits a CO$_2$/CH$_4$ selectivity increase of about 35% to about 50% at a pressure of 200 psig as compared to the same polyimide-based membrane that does not include a metal organic framework (MOF) filler that is UiO-66 or functionalized UiO-66.

In some embodiments, the method exhibits:
 (i) a CO$_2$-permeability increase of about 15% to about 150%; and
 (ii) a CO$_2$/CH$_4$ selectivity increase of about 15% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-NH$_2$ or UiO-66-COOH and the method exhibits:
 (i) a CO$_2$-permeability increase of about 100% to about 150%; and
 (ii) a CO$_2$/CH$_4$ selectivity increase of about 35% to about 50%;
at a pressure of 200 psig as compared to the same polyimide-based membrane that does not include a metal organic framework (MOF) filler that is UiO-66 or functionalized UiO-66.

In some embodiments, the method exhibits:
 (i) an H$_2$S-permeability increase of about 20% to about 140%;
 (ii) an H$_2$S/CH$_4$ selectivity increase of about 20% to about 50%;
 (iii) a CO$_2$-permeability increase of about 15% to about 150%; and
 (iv) a CO$_2$/CH$_4$ selectivity increase of about 15% to about 50%;
at a pressure of 200 psig as compared to the same polyimide-based membrane that does not include a metal organic framework (MOF) filler that is UiO-66 or functionalized UiO-66.

In some embodiments, the MOF filler is UiO-66-NH$_2$ or UiO-66-COOH and the method exhibits:
 (i) an H$_2$S-permeability increase of about 100% to about 140%;
 (ii) an H$_2$S/CH$_4$ selectivity increase of about 30% to about 50%;
 (iii) a CO$_2$-permeability increase of about 100% to about 150%; and
 (iv) a CO$_2$/CH$_4$ selectivity increase of about 35% to about 50%;
at a pressure of 200 psig as compared to the same polyimide-based membrane that does not include a metal organic framework (MOF) filler that is UiO-66 or functionalized UiO-66.

In some embodiments, the method exhibits an H$_2$S-permeability increase of about 1% to about 95% at a pressure of 500 psig as compared to the same polyimide-based membrane that does not include a metal organic framework (MOF) filler that is UiO-66 or functionalized UiO-66. In some embodiments, the MOF filler is UiO-66-NH$_2$ or UiO-66-COOH and the method exhibits an H$_2$S-permeability increase of about 75% to about 95% at a pressure of 500 psig as compared to the same polyimide-based membrane that does not include a metal organic framework (MOF) filler that is UiO-66 or functionalized UiO-66.

In some embodiments, the method exhibits an H$_2$S/CH$_4$ selectivity increase of up to about 55% at a pressure of 500 psig as compared to the same polyimide-based membrane that does not include a metal organic framework (MOF) filler that is UiO-66 or functionalized UiO-66. In some embodiments, the MOF filler is UiO-66-NH$_2$ or UiO-66-COOH and the method exhibits an H$_2$S/CH$_4$ selectivity increase of about 34% to about 55% at a pressure of 500 psig as compared to the same polyimide-based membrane that does not include a metal organic framework (MOF) filler that is UiO-66 or functionalized UiO-66.

In some embodiments, the method exhibits:
 (i) an H$_2$S-permeability increase of about 1% to about 95%; and
 (ii) an H$_2$S/CH$_4$ selectivity increase of up to about 55%;
at a pressure of 500 psig as compared to the same polyimide-based membrane that does not include a metal organic framework (MOF) filler that is UiO-66 or functionalized UiO-66.

In some embodiments, the MOF filler is UiO-66-NH$_2$ or UiO-66-COOH and the method exhibits:
 (i) an H$_2$S-permeability increase of about 75% to about 95%; and
 (ii) an H$_2$S/CH$_4$ selectivity increase of about 30% to about 55%;
at a pressure of 500 psig as compared to the same polyimide-based membrane that does not include a metal organic framework (MOF) filler that is UiO-66 or functionalized UiO-66.

In some embodiments, the method exhibits a CO$_2$-permeability increase of up to about 75% at a pressure of 500 psig as compared to the same polyimide-based membrane that does not include a metal organic framework (MOF) filler that is UiO-66 or functionalized UiO-66. In some embodiments, the MOF filler is UiO-66-NH$_2$ or UiO-66-COOH and the method exhibits a CO$_2$-permeability increase of about 30% to about 75% at a pressure of 500 psig as compared to the same polyimide-based membrane that does not include a metal organic framework (MOF) filler that is UiO-66 or functionalized UiO-66.

In some embodiments, the MOF filler is UiO-66-COOH and the method exhibits a CO$_2$/CH$_4$ selectivity increase of up about 6% at a pressure of 500 psig as compared to the same polyimide-based membrane that does not include a metal organic framework (MOF) filler that is UiO-66 or functionalized UiO-66.

In some embodiments, the MOF filler is UiO-66-COOH and the method exhibits:
 (i) a CO$_2$-permeability increase of about 30% to about 75%; and
 (ii) a CO$_2$/CH$_4$ selectivity increase of about 6%;
at a pressure of 500 psig as compared to the same polyimide-based membrane that does not include a metal organic framework (MOF) filler that is UiO-66 or functionalized UiO-66.

In some embodiments, the method exhibits:
(i) an $H_2S$-permeability increase of about 1% to about 95%;
(ii) an $H_2S/CH_4$ selectivity increase of up to about 55%; and
(iii) a $CO_2$-permeability increase of up to about 75%;
at a pressure of 500 psig as compared to the same polyimide-based membrane that does not include a metal organic framework (MOF) filler that is UiO-66 or functionalized UiO-66.

In some embodiments, the MOF filler is UiO-66-$NH_2$ or UiO-66-COOH and the method exhibits:
(i) an $H_2S$-permeability increase of about 75% to about 95%;
(ii) an $H_2S/CH_4$ selectivity increase of about 30% to about 55%; and
(iii) a $CO_2$-permeability increase of about 30% to about 75%;
at a pressure of 500 psig as compared to the same polyimide-based membrane that does not include a metal organic framework (MOF) filler that is UiO-66 or functionalized UiO-66.

Examples

Example 1. Synthesis and Physical Characterization of Hybrid Membranes

Polymer, 6FDA-diaminomesitylene (DAM)/3,5-diaminobenzoic acid (DABA) (3:2) polyimide, was purchased from Akron Polymer System Inc., while MOFs, UiO-66, UiO-66-FA, UiO-66-$NH_2$, and UiO-66-COOH, were purchased from Strem Chemicals Inc. The polymer was preheated in a vacuum oven at 100° C. overnight prior to usage, while the MOFs were preheated to 200° C. overnight prior to usage.

The 6FDA-DAM/DABA (3:2) polyimide membrane was prepared by dissolving 6FDA-DAM/DABA (3:2) in THF to form about a 5 wt % polyimide/THF mixture. The polyimide/THF mixture was further mixed on a rolling mixer overnight to dissolve the polymer. The resulting solution was poured onto a polytetrafluoroethylene (PTFE) evaporating dish in a glove bag pre-saturated with THF vapor, and the solution was allowed at least 4 h slow evaporation to create 70-90 μm films. The films were left overnight and dried under vacuum oven at 200° C. for 24 h to remove remaining solvent.

The hybrid membranes were prepared by dispersing dried MOF crystals in THF to form about 5 wt % MOF/THF suspensions. The MOF/THF suspensions were then added to about 5 wt % 6FDA-DAM/DABA (3:2)/THF solution to form dopes. After being mixed thoroughly on a rolling mixer overnight, excess solvent was removed by a rotary evaporator. The resulting suspension was poured onto (PTFE) evaporating dishes placed in a glove bag pre-saturated with THF vapor, followed by allowing at least 4 h slow evaporation to create 70-90 μm films. The films were left overnight and finally dried under vacuum oven at 200° C. for 24 h to remove remaining solvent. All hybrid membranes were fabricated with a MOF/polymer ratio of about 10:90 by weight. FIG. 2A-2D show the SEM images of the fabricated hybrid membranes, indicating excellent MOF particle dispersion in the polymer matrix.

Example 2. Characterization of Gas Separation Properties of Hybrid Membranes The hybrid membranes were characterized using a constant-volume apparatus at room temperature and 200 and 500 psig. For comparison, neat 6FDA-DAM/DABA (3:2) thin film membranes were also measured to investigate the performance enhancement of the incorporated MOF fillers in the hybrid membranes.

A sour gas mixture simulating realistic natural gas was used in the permeation measurements, including $H_2S/CO_2/CH_4/C_2H_6/N_2$ (20/10/57/3/10 by volume). The downstream composition was determined using a gas chromatograph (Shimadzu GC-2014). The stage cut (the flow rate ratio of permeate to feed) was maintained below 1%. All results were collected at the steady state. Table 2 summarizes the membrane permeation results in terms of $H_2S/CH_4$ and $CO_2/CH_4$ separations measured by the $H_2S/CO_2/CH_4/C_2H_6/N_2$ (20/10/57/3/10) feed.

TABLE 2

$H_2S/CO_2/CH_4/C_2H_6/N_2$ (20/10/57/3/10 by volume) mixed gas permeation results of hybrid membranes at room temperature and 200 and 500 psig.

| Membranes | Pressure (psig) | Permeability (Barrer) | | | | | Selectivity | | | |
| --- | --- | --- | --- | --- | --- | --- | --- | --- | --- | --- |
| | | $H_2S$ | $CO_2$ | $CH_4$ | $C_2H_6$ | $N_2$ | $H_2S/CH_4$ | $CO_2/CH_4$ | $CO_2/N_2$ | $H_2S/N_2$ |
| Polymer* | 200 | 27.4 | 43.4 | 1.4 | 0.4 | 17.7 | 19.6 | 31.0 | 2.5 | 1.5 |
| | 500 | 45.4 | 56.1 | 1.7 | 0.6 | 2.6 | 26.7 | 33.0 | 21.6 | 17.5 |
| Hybrid-UiO-66# | 200 | 37.5 | 58.3 | 1.5 | 0.7 | 2.7 | 24.4 | 38.0 | 21.6 | 13.9 |
| | 500 | 64.8 | 60.0 | 3.1 | 2.1 | 3.6 | 19.1 | 20.7 | 16.7 | 18.0 |
| Hybrid-UiO-66-FA# | 200 | 33.3 | 50.4 | 1.4 | 0.2 | 2.0 | 24.5 | 37.1 | 25.2 | 16.7 |
| | 500 | 46.1 | 45.4 | 1.5 | 0.9 | 3.1 | 30.5 | 30.0 | 14.6 | 14.9 |
| Hybrid-UiO-66-$NH_2$# | 200 | 54.9 | 90.0 | 2.1 | 1.2 | 4.0 | 26.1 | 42.9 | 22.5 | 13.7 |
| | 500 | 81.1 | 73.7 | 2.3 | 3.4 | 2.8 | 35.9 | 32.7 | 26.3 | 29.0 |
| Hybrid-UiO-66-COOH# | 200 | 66.1 | 111.5 | 2.3 | 0.1 | 6.6 | 29.1 | 49.0 | 16.9 | 10.0 |
| | 500 | 89.0 | 99.5 | 2.8 | 1.8 | 4.2 | 41.6 | 35.3 | 23.7 | 21.2 |

*6FDA-DAM/DABA (3:2) polymer.

Hybrid membranes including 10 wt % MOF loading amounts in 6FDA-DAM/DABA (3:2) polymer matrices. For simplicity, only the MOF name is shown.

Figure 3:
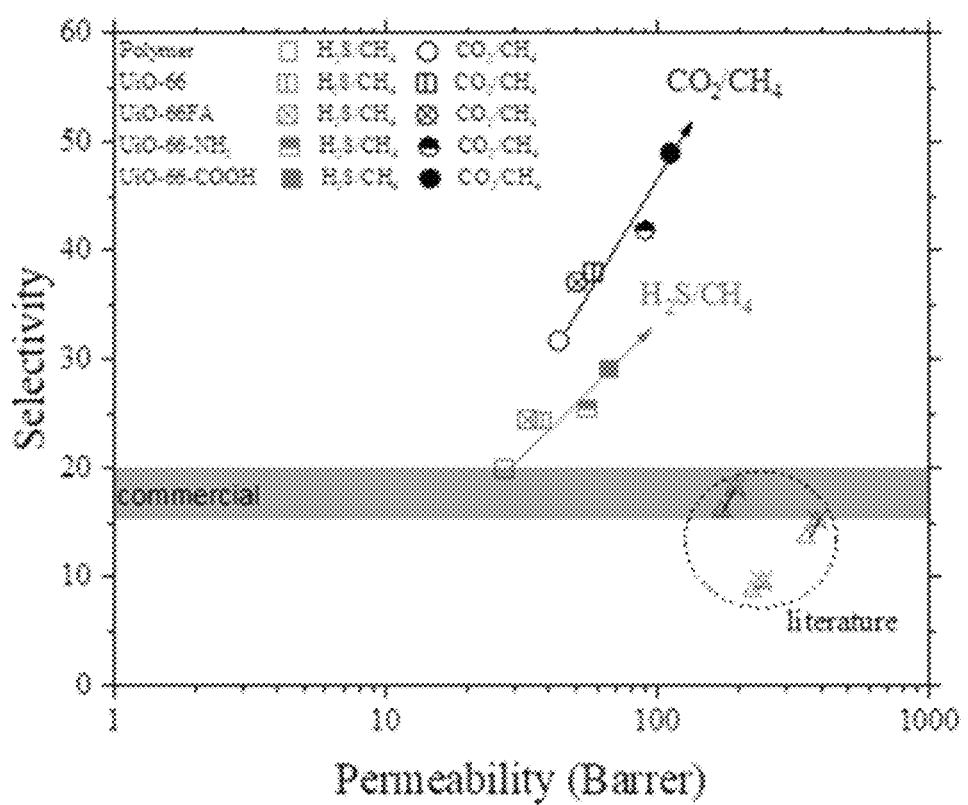
FIG. 3 shows a graph showing permeation results of the fabricated hybrid membranes at 25° C. and 200 psig using the simulated H$_2$S/CO$_2$/CH$_4$/C$_2$H$_6$/N$_2$ (20/10/57/3/10) natural gas feed. All hybrid membranes were prepared with a MOF loading amount of about 10 wt %. Literature data reporting UiO-66, UiO-66-NH$_2$, and UiO-66-NH—COCH$_3$ fillers incorporated into 6FDA-DAM polyimide matrix are shown for comparison.

FIG. 3 shows the permeation results of the neat polymer and hybrid membranes at 25° C. and 200 psig using the simulated $H_2S/CO_2/CH_4/C_2H_6/N_2$ (20/10/57/3/10) natural gas feed compared to previously reported membranes (Ahmad, M. Z., et al. (2020). "High-pressure $CO_2/CH_4$ separation of Zr-MOFs based mixed matrix membranes." Separation and Purification Technology 230: 115858.).

Compared to the neat polymer membrane, the hybrid membranes including MOF fillers exhibited both enhanced $H_2S/CH_4$ and $CO_2/CH_4$ separation performance. The hybrid membranes incorporated with functionalized MOF fillers (i.e., UiO-66-$NH_2$ and UiO-66-COOH) showed dramatically improved separation efficiencies. The UiO-66-COOH filler outperformed the other MOF fillers evaluated in terms of $H_2S$ and $CO_2$ permeability and $H_2S/CH_4$ and $CO_2/CH_4$ selectivity. Compared to the pure 6FDA-DAM/DABA (3:2) membrane, the UiO-66-COOH/6FDA-DAM-DABA (3:2) (10 wt %) membrane shows about 2.4 times $H_2S$ permeability and about 2.6 times $CO_2$ permeability along with about 1.5 times $H_2S/CH_4$ selectivity and about 1.6 times $CO_2/CH_4$ selectivity.

Figure 4:
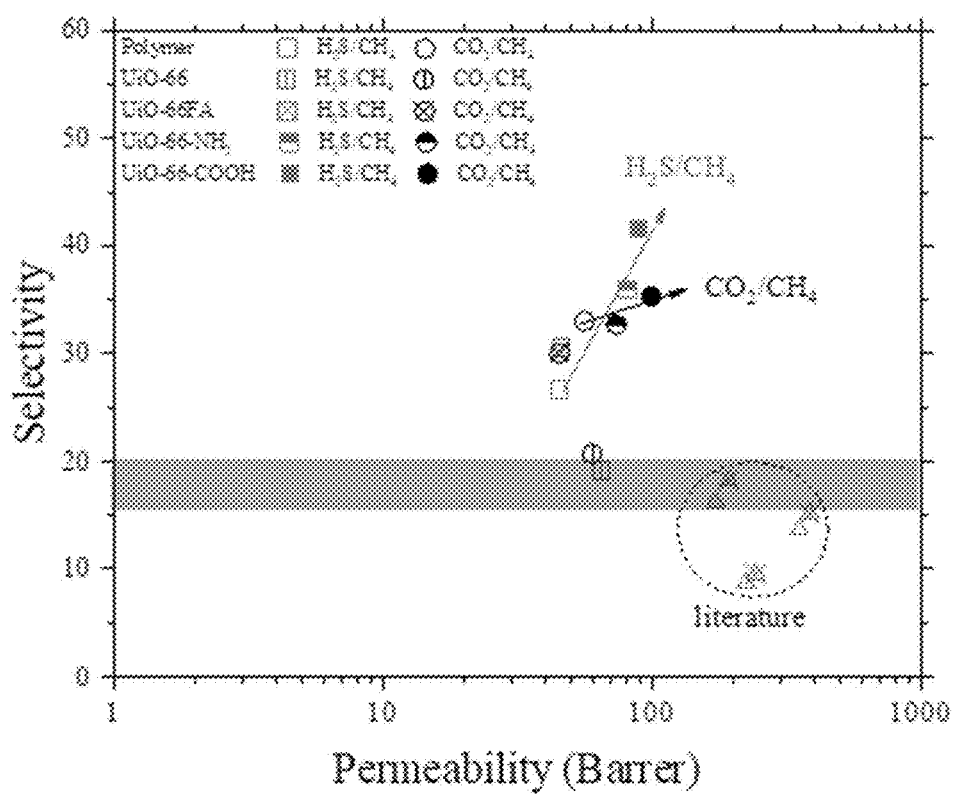
FIG. 4 shows a graph showing permeation results of the fabricated hybrid membranes 25° C. and 500 psig using the simulated H$_2$S/CO$_2$/CH$_4$/C$_2$H$_6$/N$_2$ (20/10/57/3/10) natural gas feed. All hybrid membranes were prepared with a MOF loading amount of about 10 wt %. Literature data reporting UiO-66, UiO-66-NH$_2$, and UiO-66-NH—COCH$_3$ fillers incorporated into 6FDA-DAM polyimide matrix are shown for comparison.

FIG. 4 shows the permeation results of the neat polymer and hybrid membranes at 25° C. and 500 psig using the simulated $H_2S/CO_2/CH_4/C_2H_6/N_2$ (20/10/57/3/10) natural gas feed compared to previously reported membranes (Ahmad, M. Z., et al. (2020). "High-pressure $CO_2/CH_4$ separation of Zr-MOFs based mixed matrix membranes." Separation and Purification Technology 230: 115858.).

By increasing the feed pressure from 200 to 500 psig, some MOF fillers could not maintain higher $H_2S/CH_4$ and $CO_2/CH_4$ separation performances than the neat polymer membrane. Compared to their performance at 200 psig, the hybrid membranes with UiO-66 and UiO-66-FA fillers showed lower $H_2S/CH_4$ and $CO_2/CH_4$ selectivities. However, the hybrid membranes with functionalized MOF fillers (i.e., UiO-66-$NH_2$ and UiO-66-COOH) showed improved $H_2S/CH_4$ and $CO_2/CH_4$ separation performance in terms of permeability and selectivity compared to the pure 6FDA-DAM/DABA (3:2) membrane. This data shows that functionalized MOF fillers can greatly promote the natural gas sweetening performance of hybrid membranes.

FIG. 3 and FIG. 4 highlight the advantage of choosing hybrid membranes compared to 6FDA-DAM/DABA as the polymer matrix. For membranes including up to 10 wt % UiO-66-$NH_2$ or UiO-66-COOH in 6FDA-DAM/DABA, polymer matrices display improvement in $H_2S/CH_4$ and $CO_2/CH_4$ mixed gas selectivities and permeabilities at both 200 psig and 500 psig compared to neat 6FDA-DAM/DABA polymer-based membranes. For membranes including up to 10 wt % non-modified UiO-66 MOF in 6FDA-DAM/DABA, polymer matrices display decreased $H_2S/CH_4$ and $CO_2/CH_4$ mixed gas selectivities compared to neat 6FDA-DAM/DABA polymer based membranes.

Example 3. Stability of MOF Particles Under $H_2S$ Conditions

Figure 5:
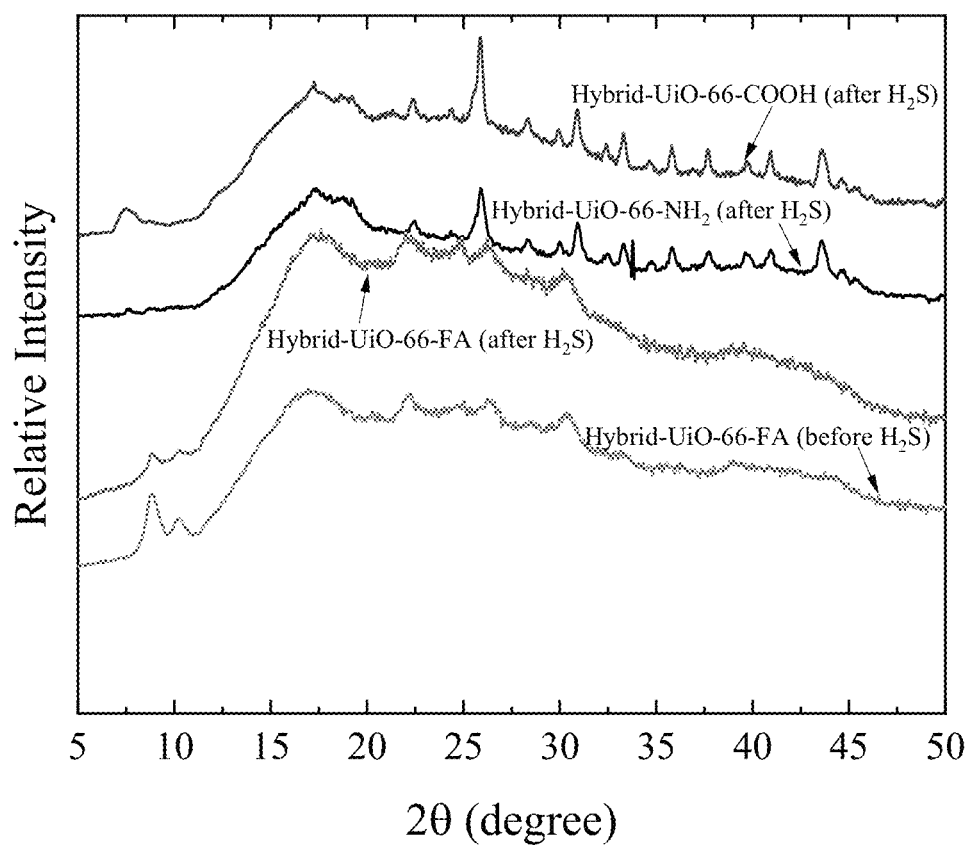
FIG. 5 shows X-ray diffraction (XRD) results of 6FDA-DAM/DABA (3:2) matrix and hybrid membranes incorporating different MOF fillers: UiO-66-FA (before and after exposure to H$_2$S), UiO-66-NH$_2$ (after exposure to H$_2$S), and UiO-66-COOH (after exposure to H$_2$S).

The stability of MOF particles under $H_2S$ conditions was also investigated to elucidate their application potential under aggressive natural gas sweetening conditions. The X-ray diffraction (XRD) results of the membranes before and after $H_2S$-related permeation measurements suggest the MOF particles can retain its original crystalline structure (FIG. 5).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A hybrid membrane comprising:
   a metal organic framework (MOF) filler, wherein the MOF filler is UiO-66 or a functionalized UiO-66; and
   a polymer, wherein the polymer is a 6FDA-DAM/DABA polymer.

2. The hybrid membrane of claim 1, wherein the 6FDA-DAM/DABA polymer is 6FDA-DAM/DABA (3:2).

3. The hybrid membrane of claim 1, wherein the MOF filler is a functionalized UiO-66, wherein the functionalized UiO-66 is selected from UiO-66-FA, UiO-66-$NH_2$, and UiO-66-COOH.

4. The hybrid membrane of claim 1, wherein the MOF filler is about 1 wt % to about 25 wt %, about 3 wt % to about 20 wt %, about 5 wt % to about 15 wt %, about 7 wt % to about 13 wt %, or about 9 wt % to about 11 wt % of the hybrid membrane.

5. The hybrid membrane of claim 1, wherein the MOF filler is about 10 wt % of the hybrid membrane.

6. The hybrid membrane of claim 1, wherein the polymer is about 75 wt % to about 99 wt %, about 80 wt % to about 97 wt %, about 85 wt % to about 95 wt %, about 87 wt % to about 93 wt %, or about 89 wt % to about 91 wt % of the hybrid membrane.

7. The hybrid membrane of claim 1, wherein the polymer is about 90 wt % of the hybrid membrane.

8. The hybrid membrane of claim 1, wherein the MOF filler is about 5 wt % to about 15 wt % of the hybrid membrane and the polymer is about 85 wt % to about 95 wt % of the hybrid membrane.

9. The hybrid membrane of claim 5, wherein the UiO-66-Nthis about 5 wt % to about 15 wt % of the hybrid membrane and the polymer is about 85 wt % to about 95 wt % of the hybrid membrane.

10. The hybrid membrane of claim 6, wherein the UiO-66-COOH is about 5 wt % to about 15 wt % of the hybrid membrane and the polymer is about 85 wt % to about 95 wt % of the hybrid membrane.

11. The hybrid membrane of claim 1, wherein the hybrid membrane exhibits:
   (i) an $H_2S$-permeability increase of about 20% to about 140%; and
   (ii) an $H_2S/CH_4$ selectivity increase of about 20% to about 50%;
   at a pressure of 200 psig as compared to the same polyimide-based membrane that does not comprise a metal organic framework (MOF) filler that is UiO-66 or functionalized UiO-66.

12. The hybrid membrane of claim 1, wherein the hybrid membrane exhibits:
   (i) a $CO_2$-permeability increase of about 15% to about 150%; and
   (ii) a $CO_2/CH_4$ selectivity increase of about 15% to about 50%;
   at a pressure of 200 psig as compared to the same polyimide-based membrane that does not comprise a metal organic framework (MOF) filler that is UiO-66 or functionalized UiO-66.

13. The hybrid membrane of claim 1, wherein the hybrid membrane exhibits:
   (i) an $H_2S$-permeability increase of about 20% to about 140%;

(ii) an $H_2S/CH_4$ selectivity increase of about 20% to about 50%;
(iii) a $CO_2$-permeability increase of about 15% to about 150%; and
(iv) a $CO_2/CH_4$ selectivity increase of about 15% to about 50%;
at a pressure of 200 psig as compared to the same polyimide-based membrane that does not comprise a metal organic framework (MOF) filler that is UiO-66 or functionalized UiO-66.

14. A method of preparing a hybrid membrane, comprising:
providing a polymer solution comprising a first solvent and a polymer, which is a 6FDA-DAM/DABA polymer;
combining the polymer solution with a metal organic framework (MOF) filler solution comprising a second solvent and a metal organic framework (MOF) filler, wherein the MOF filler is UiO-66 or functionalized UiO-66, to form a MOF-polymer solution, comprising a third solvent;
evaporating the third solvent to form a hybrid membrane film; and
drying the hybrid membrane film to form the hybrid membrane.

15. The hybrid membrane of claim 14, wherein the 6FDA-DAM/DABA polymer is 6FDA-DAM/DABA (3:2).

16. The method of claim 14, wherein the MOF filler is functionalized UiO-66, wherein the functionalized UiO-66 is selected from UiO-66-FA, UiO-66-$NH_2$, and UiO-66-COOH.

17. A method of separating at least one impurity from natural gas, comprising:
providing a hybrid membrane comprising:
a metal organic framework (MOF) filler, wherein the MOF filler is UiO-66 or functionalized UiO-66; and
a polymer, wherein the polymer is a 6FDA-DAM/DABA polymer;
introducing a natural gas stream to the hybrid membrane; and
removing at least one impurity from the natural gas.

18. The method of claim 17, wherein the 6FDA-DAM/DABA polymer is 6FDA-DAM/DABA (3:2).

19. The method of claim 17, wherein the MOF filler is functionalized UiO-66, wherein the functionalized UiO-66 is selected from UiO-66-FA, UiO-66-$NH_2$, and UiO-66-COOH.

20. The method of claim 17, wherein the impurity is selected from hydrogen sulfide ($H_2S$), carbon dioxide ($CO_2$), ethane ($C_2H_6$), nitrogen ($N_2$), $C_3$+ hydrocarbons, water ($H_2O$), and combinations thereof.

21. The method of claim 20, wherein the impurity is a combination of hydrogen sulfide ($H_2S$) and carbon dioxide ($CO_2$).

22. The method of claim 20, wherein the hybrid membrane exhibits:
(i) an $H_2S$-permeability increase of about 20% to about 140%; and
(ii) an $H_2S/CH_4$ selectivity increase of about 20% to about 50%;
at a pressure of 200 psig as compared to the same polyimide-based membrane that does not comprise a metal organic framework (MOF) filler that is UiO-66 or functionalized UiO-66.

23. The method of claim 20, wherein the hybrid membrane exhibits:
(i) a $CO_2$-permeability increase of about 15% to about 150%; and
(ii) a $CO_2/CH_4$ selectivity increase of about 15% to about 50%;
at a pressure of 200 psig as compared to the same polyimide-based membrane that does not comprise a metal organic framework (MOF) filler that is UiO-66 or functionalized UiO-66.

24. The method of claim 21, wherein the hybrid membrane exhibits:
(i) an $H_2S$-permeability increase of about 20% to about 140%;
(ii) an $H_2S/CH_4$ selectivity increase of about 20% to about 50%;
(iii) a $CO_2$-permeability increase of about 15% to about 150%; and
(iv) a $CO_2/CH_4$ selectivity increase of about 15% to about 50%;
at a pressure of 200 psig as compared to the same polyimide-based membrane that does not comprise a metal organic framework (MOF) filler that is UiO-66 or functionalized UiO-66.

* * * * *

UNITED STATES PATENT AND TRADEMARK OFFICE
CERTIFICATE OF CORRECTION

| | | |
|---|---|---|
| PATENT NO. | : 11,834,619 B1 | Page 1 of 1 |
| APPLICATION NO. | : 18/082979 | |
| DATED | : December 5, 2023 | |
| INVENTOR(S) | : Yang Liu and Junyan Yang | |

It is certified that error appears in the above-identified patent and that said Letters Patent is hereby corrected as shown below:

In the Claims

In Column 24, Line 37, Claim 9, please replace "66-Nthis" with -- 66-$NH_2$ is --.

Signed and Sealed this
Fifth Day of March, 2024

*Katherine Kelly Vidal*

Katherine Kelly Vidal
*Director of the United States Patent and Trademark Office*